US011341025B2

(12) United States Patent
Malleni

(10) Patent No.: US 11,341,025 B2
(45) Date of Patent: May 24, 2022

(54) DYNAMIC TUNING OF COMPUTING DEVICES USING APPLICATION LOG DATA

(71) Applicant: Red Hat, Inc., Raleigh, NC (US)

(72) Inventor: Sai Sindhur Malleni, Marlborough, MA (US)

(73) Assignee: RED HAT INC., Raleigh, NC (US)

( * ) Notice: Subject to any disclaimer, the term of this patent is extended or adjusted under 35 U.S.C. 154(b) by 190 days.

(21) Appl. No.: 16/884,660

(22) Filed: May 27, 2020

(65) Prior Publication Data

US 2021/0374034 A1   Dec. 2, 2021

(51) Int. Cl.
*G06F 9/50* (2006.01)
*G06F 11/34* (2006.01)
*G06F 9/445* (2018.01)
*G06N 3/04* (2006.01)

(52) U.S. Cl.
CPC ...... *G06F 11/3476* (2013.01); *G06F 9/44505* (2013.01); *G06F 9/5016* (2013.01); *G06F 9/5044* (2013.01); *G06N 3/0445* (2013.01); *G06F 2201/835* (2013.01)

(58) Field of Classification Search
CPC .................................................. G06F 9/5016
See application file for complete search history.

(56) References Cited

U.S. PATENT DOCUMENTS 7,379,994 B2    5/2008  Collazo
8,897,174 B2 *  11/2014 Komarevtsev ...... H04L 41/0843
                                                  370/255
10,608,911 B2   3/2020  Nickolov et al.

FOREIGN PATENT DOCUMENTS

CN    107908521 A    4/2018
CN    109032915 A    12/2018
CN    110764786 A    2/2020

OTHER PUBLICATIONS

Aken et al.; Automatic Database Management System Tuning Through Large-scale Machine Learning; Carnegie Mellon University; Peking University; May 14, 2017; 16 pgs.
Author unknown; Collect and View Logs with Grafana Loki; Downloaded from: https://medium.com/@_oleksii_/collect-and-view-logs-with-grafana-loki-33d9155ac581on May 20, 2020; Mar. 11, 2019; 9 pgs.

* cited by examiner

*Primary Examiner* — Charlie Sun
(74) *Attorney, Agent, or Firm* — K&L Gates LLP

(57) ABSTRACT

A system includes a memory and at least one processor in communication with the memory. A processor is configured to receive a first log message denoting an event associated with a first application executing in the system. A machine learning model generates a predicted log message based at least in part on the first log message. The predicted log message represents a prediction of a subsequent log message to be received from the first application. First metric data associated with the predicted log message is determined. The first metric data describes system conditions of the system associated with the predicted log message. A tuning profile associated with the system conditions is determined and the current system configuration of the system is modified using the tuning profile.

20 Claims, 6 Drawing Sheets

DYNAMIC TUNING OF COMPUTING DEVICES USING APPLICATION LOG DATA

BACKGROUND

Computer systems may run applications and processes that execute various instructions on a processor. Computing systems may have different computing configurations. For example, processors may execute instructions at various performance levels based on the processors frequency and/or the voltage supplied to the processor. In another example, an application executing on a system may be allotted a set amount of memory according to a configuration of the virtual machine instance and/or container. In addition, network configurations may be modified in order to vary the throughput of data transmitted and/or received.

SUMMARY

The present disclosure provides new and innovative systems and methods for tuning computing device configurations using application log data. In an example, a system includes a memory and at least one processor in communication with the memory. One or more of the processors are configured to receive a first log message denoting an event associated with a first application executing in the system. In various examples, a machine learning model generates a predicted log message. The predicted log message represents a prediction of a subsequent log message to be received from the first application. The predicted log message is generated by the machine learning model based on the first log message. In various examples, the one or more processors are further configured to determine first metric data associated with the predicted log message. The first metric data describes system conditions of the system associated with the predicted log message. In an example, a tuning profile that is associated with the system conditions is determined. The tuning profile includes one or more parameters associated with a past system configuration. In an example, a current system configuration of the system is modified using the one or more parameters of the tuning profile to generate a modified system configuration.

In an example, a method includes receiving a first log message denoting an event associated with a first application executing in a system. A machine learning model generates a predicted log message based at least in part on the first log message. The predicted log message represents a prediction of a subsequent log message to be received from the first application. First metric data associated with the predicted log message is determined. The first metric data describes system conditions of the system that are associated with the predicted log message. A tuning profile that is associated with the system conditions is determined. The tuning profile includes one or more parameters associated with a past system configuration. In some examples, the method may further include modifying a current system configuration using the one or more parameters of the tuning profile to generate a modified system configuration.

In an example, a non-transitory machine readable medium stores a program, which when executed by at least one processor causes the processor to receive a first log message denoting an event associated with a first application executing in a system. A machine learning model generates a predicted log message based at least in part on the first log message. The predicted log message represents a prediction of a subsequent log message to be received from the first application. First metric data associated with the predicted log message is generated. The first metric data describes system conditions of the system that are associated with the predicted log message. A tuning profile associated with the system conditions is determined. The tuning profile includes one or more parameters associated with a past system configuration. In some examples, a current system configuration is modified using the one or more parameters of the tuning profile to generate a modified system configuration.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
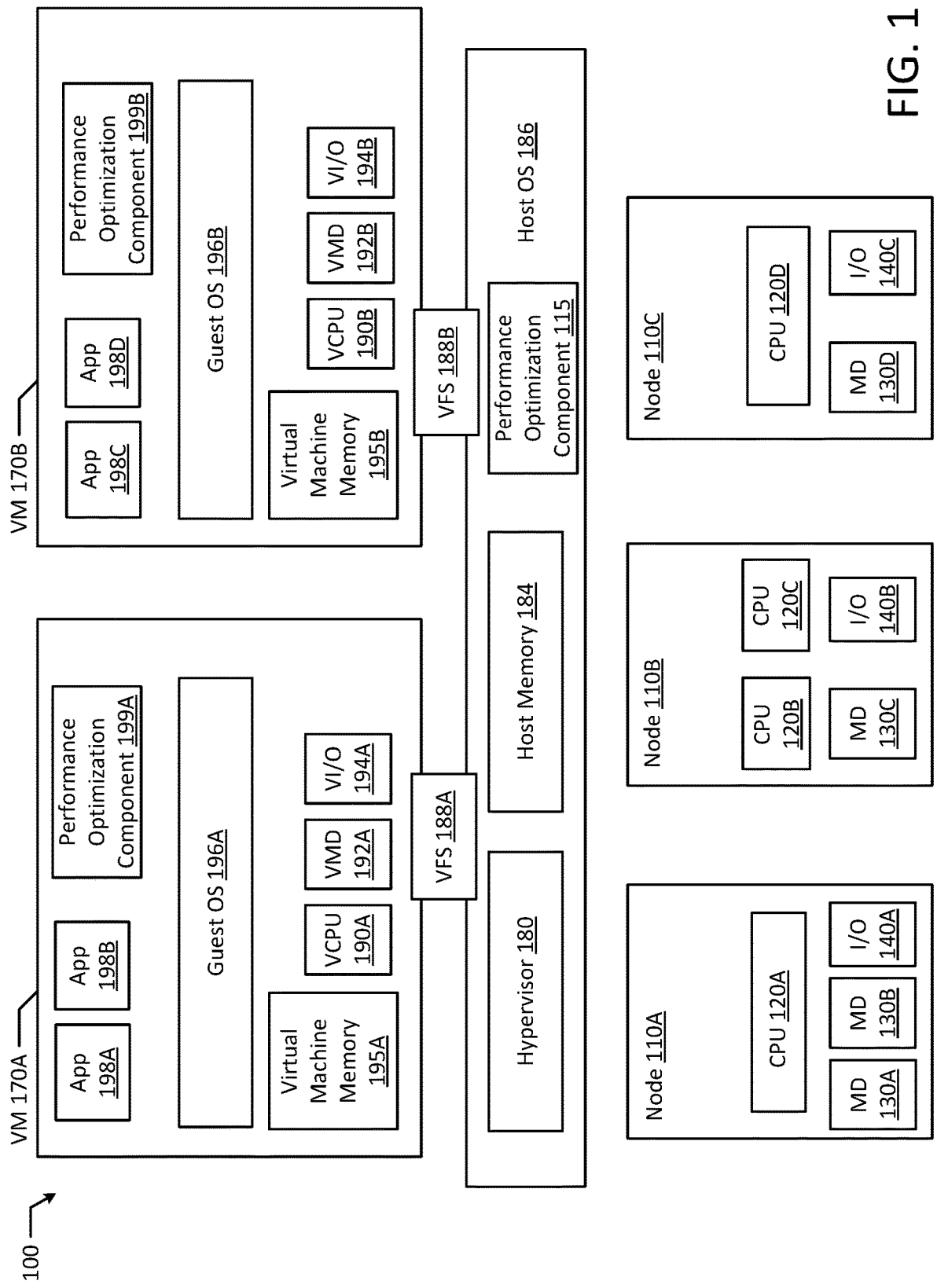
FIG. 1 illustrates a block diagram of an example computer system according to an example embodiment of the present disclosure.

Techniques are disclosed for dynamically and proactively tuning computing devices (e.g., servers) for optimal performance based on the current compute load without prior knowledge of and/or prior evaluation of the compute load. The various techniques described herein are "dynamic" insofar as the techniques are effective to modify computing system configurations using real time and historical application log message data to optimize computing system performance for the current, real time compute load.

Hardware and software based performance optimization techniques have been used in the performance engineering domain to tune server performance. Typically, subject matter experts and/or pre-defined server configurations (sometimes known as "recipes") are used to tune compute resources in the cloud and/or on bare metal servers. Oftentimes, the pre-defined configurations provide general purpose tuning (e.g., for a particular application, set of applications, and/or computing task) which is not tailored to the specific application(s) running at a given moment. For example, if a server is executing a database, the general recommended system configuration for a MySQL database execution may, in reality, not be optimized if the server is using PostgreSQL.

Typically, in order to provide customized server tuning, performance engineering experts having a deep understanding of the server workload are employed to profile the workload and recommend specific tunings/configurations. However, even using such experts, the tunings/configurations may not be optimized for a given application's needs at a particular moment, which may depend on what tasks the application is executing at a given time. As such, the feedback loop for computing device performance tuning can be quite long and non-responsive to current compute conditions. Accordingly, described herein are various techniques that may be used to provide customized and dynamic computing device tuning in real time.

Applications may generally include code to write various types of application events to an application log file as log messages. The log file may reveal message flow issues and/or application problems. It may also include information about user and/or system actions that have occurred. In various examples described herein, log messages received from an application may be stored in a data structure. Additionally, system metric data may be determined during the time at which a log message is received and/or generated. System metric data may describe the performance of a system (e.g., a computing device, a cloud computing environment, and/or a network interface of computing devices) executing the application. For example, the metric data may describe system conditions such as performance data indicating a performance of various system components. For example, the metric data may describe system conditions such as CPU usage (e.g., in cores, millicores, etc.), memory usage (e.g., in megabytes), network throughput (e.g., in packets-per-second), disk access (e.g., in input/output operations per second ("IOPS")), etc. The log message and/or the metric data may be associated with respective time stamps indicating a time at which the log message was generated and/or a time at which the metric data was determined.

Log messages may be stored in a data structure (e.g., an array, dictionary, etc.) along with metric data indicating system conditions at the time at which the respective log messages were generated. In various examples, a row of a data structure may include a particular log message in one column and the metric data associated with that log message in another column. The particular system conditions prevalent when a particular log message is received may vary over time. Accordingly, in some examples, the system conditions for a particular log message may be averaged over time and stored in association with the log message.

After populating a data structure with log messages and metric data representing system conditions associated with the log messages, a machine learning model may be used to predict the next log message to be generated by an application based on a time series of past log messages (e.g., string constants of a time series of log messages). In various examples, a recurrent neural network (RNN) such as a long short term memory (LSTM) model may be used to predict a next log message based on a time series of historical log messages.

Upon prediction of the next log message, the predicted log message may be used to look up the metric data associated with the predicted log message in the data structure. As such, the predicted log message may be correlated with metric data describing system conditions of the system that are associated with the predicted log message. In turn, the system conditions may be used to determine a tuning profile for configuring the system. Tuning profiles may span a range of particular system conditions. For example, a first predicted log message may be associated with metric data indicating a system condition of 1.1 cores CPU usage. A tuning profile may be associated with CPU usage of 1-2 cores (among other system conditions). Accordingly, the particular system condition associated with the predicted log message (1.1 cores CPU usage) may be used to determine the appropriate tuning profile (e.g., the tuning profile associated with 1-2 cores CPU usage).

Accordingly, the tuning profiles may be associated with ranges (or "buckets") of system conditions. Additionally, each tuning profile may be associated with configuration parameters that may be used to configure the system to optimize the system for the current conditions. The parameters may specify CPU voltage/frequency, memory allocation, network throughput/latency parameters, disk access read/write frequency, etc.

FIG. 1 depicts a high-level component diagram of an example computer system 100 in accordance with one or more aspects of the present disclosure. The computing system 100 may include an operating system (e.g., host OS 186), one or more virtual machines (VM 170A-B) and nodes (e.g., nodes 110A-C).

Generally, although virtual machines 170A-B are discussed in reference to FIG. 1, the techniques used to provide dynamic configurations based on predicted application log messages described herein are applicable to other system/device configurations apart from virtual machines. For example, the techniques described herein may be used to dynamically tune configurations of physical computing devices, virtual machines, lightweight virtualized computing instances such as containers and/or other hybrid virtualization technologies, etc. Accordingly, it may be appreciated that while various examples described herein are in reference to tuning of virtual machine configurations, the techniques are also applicable to other computing technologies.

Virtual machines 170A-B may include a guest OS, guest memory, a virtual CPU (VCPU), virtual memory devices (VIVID), and virtual input/output devices (VI/O). For example, VM 170A may include guest OS 196A, guest memory or virtual machine memory 195A, a virtual CPU 190A, a virtual memory device 192A, and virtual input/output device 194A. Virtual machine memory 195A may include one or more memory pages. Similarly, VM 170B may include guest OS 196B, virtual machine memory 195B, a virtual CPU 190B, a virtual memory device 192B, and virtual input/output device 194B. Virtual machine memory 195B may include one or more memory pages.

In various examples, a performance optimization component 199A, 199B may be executed by guest operating systems 196A, 196B, etc. The performance optimization component 199A, 199B may be effective to receive log message data from one or more applications being executed by the respective virtual machines 170A, 170B and may predict a subsequent log message to be generated by the applications, as described in further detail below. The predicted log message may be correlated with system conditions. In turn, the system conditions may be used to tune the configuration of the virtual machine in accordance with the predicted future state of the system.

The computing system 100 may also include a hypervisor 180 and host memory 184. The hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

The hypervisor 180 may be configured to allocate a memory page (e.g., guest-writable memory page) for each page table of a set of page tables used by applications (e.g., applications 198A-D). In an example, the hypervisor 180 may be configured to map each respective memory page (e.g., guest-writable memory page) at a guest physical address in each page table. In addition, the hypervisor 180 may be configured to control access to underlying hardware (e.g., hardware of nodes 110A, 110B, 110C, etc.).

In various examples, VMs 170A, 170B may communicate with host operating system 186 through a virtual file system (VFS), such as VFS 188A, 188B. In some examples, host OS 186 and/or hypervisor 180 may implement performance optimization component 115. Performance optimization component 115 may be effective to received a time series of log messages from one or more applications (e.g., applications executed by one or more of VM 170A, 170B, etc.). The performance optimization component 115 may determine system conditions associated with the predicted log messages (as described in further detail below) and may tune system configurations based on the system conditions (e.g., by allocating memory, processor resources, I/O resources, network resources, etc. to VM 170A, 170B).

In an example, a VM 170A may execute a guest operating system 196A and run applications 198A-B which may utilize the underlying VCPU 190A, VIVID 192A, and VI/O device 194A. One or more applications 198A-B may be running on a VM 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a VM 170A may be dependent on the underlying hardware and/or OS 186. In another example embodiment, applications 198A-B run on a VM 170A may be independent of the underlying hardware and/or OS 186. For example, applications 198A-B run on a first VM 170A may be dependent on the underlying hardware and/or host OS 186 while applications (e.g., application 198C-D) run on a second virtual machine (e.g., VM 170B) are independent of the underlying hardware and/or OS 186A. Additionally, applications 198A-B run on a VM 170A may be compatible with the underlying hardware and/or OS 186. In an example embodiment, applications 198A-B run on a VM 170A may be incompatible with the underlying hardware and/or OS 186. For example, applications 198A-B run on one VM 170A may be compatible with the underlying hardware and/or OS 186A while applications 198C-D run on another VM 170B are incompatible with the underlying hardware and/or OS 186. In an example embodiment, a device may be implemented as a virtual machine (e.g., VM 170A-B).

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). In various examples, configurations of nodes 110A-C may be tuned (e.g., modified) using performance optimization component 115 based on real time changes in system conditions and/or predicted future system conditions. The system conditions may be predicted based on a time series of log messages being generated by applications (e.g., App 198A, 198B, 198C, 198D, etc.). For example, performance optimization component 115 may be used to predict a next log message to be generated by an application. The predicted log message may be associated with metric data describing system conditions (e.g., past system conditions associated with a past occurrence of the predicted log message). Accordingly, the performance optimization component 115 may tune the configuration of nodes 110A-C based on the predicted system conditions, as described in further detail below.

Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor (e.g., CPU 120A-D) refers to a device capable of executing instructions encoding arithmetic, logical, and/or I/O operations. In one illustrative example, a processor may follow a Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as random access memory (RAM), read only memory (ROM), electrically erasable read only memory (EEPROM), or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
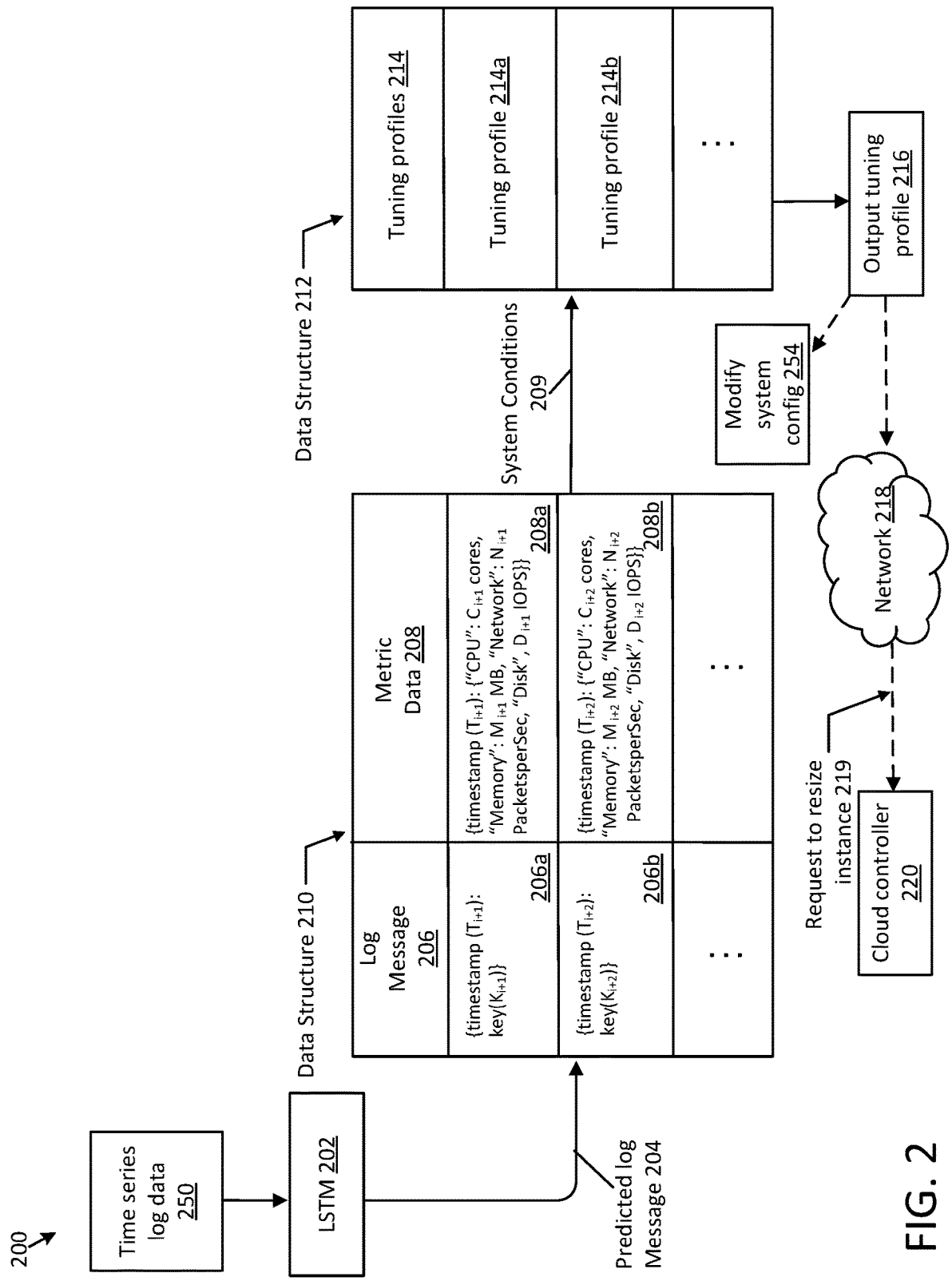
FIG. 2 illustrates an example block diagram representing computing device tuning using predicted application log data according to an example embodiment of the present disclosure.

FIG. 2 illustrates an example block diagram representing a computing device tuning using predicted application log data according to an example embodiment of the present disclosure. In various examples, the system 200 depicted in FIG. 2 may be components of a performance optimization component, such as performance optimization components 199A, 199B, and/or 115 depicted in FIG. 1.

In various examples, a machine learning model, such as a recurrent neural network (RNN) may be used to predict future application log messages based on a time series of historical log messages generated by one or more applications. In the example embodiment depicted in FIG. 2, time series log data 250 may comprise a time series of past log data generated by one or more applications being executed by a particular computing system. In some examples, the time series log data 250 may culminate in a current log message generated by the one or more applications. In some examples, the one or more applications may be executed by different computing devices (e.g., in a cloud computing environment).

In various examples, the log messages of the time series log data 250 may represent structured log data that may be generated from raw, unstructured log messages generated by one or more applications. For example, string constant data (e.g., log keys) may be determined for each unstructured log message and may be stored in data structure 210 together with a time stamp as structured data (e.g., log message 206).

For example, a log message may be "Creating user John," that is generated from the log message source code: "logging.info("Creating user { }").format(user)". In this example, the log key Ki may be the string constant "Creating user." Hence the log message 206 may be stored as structured data of the form {time stamp($T_0$): key($K_0$)}, where the key is the string constant of the log message. The structured data representing the log message may be stored in data structure 210 as a log message 206.

Additionally, metric data 208 may be stored in the data structure 210 in association with the log messages 206. The metric data (e.g., structured data representing system conditions) may be determined as a time series. Metric data that corresponds (in time) with a particular log message 206 may be stored in association with the log message in data structure 210. Broadly, metric data may track CPU usage, memory usage, network usage, and disk usage. However, other metric data may be tracked apart from those specifically described, in accordance with the desired implementation. For example, queue data, utilization %, etc., may be tracked for disk access.

In various examples, metric data may be determined using virtual filesystems (e.g., the/proc and/or/sys virtual filesystems exposed by the Linux kernel). The virtual filesystems may provide unstructured metric data. Structured metric data may be generated from the unstructured metric data and may be stored in association with a time stamp. For example, the structured metric data 208 may be of the form: {time stamp($T_0$): {"CPU": $C_0$ cores, "Memory": $M_0$ MB, "Network": $N_0$ PacketsperSec, "Disk", $D_0$ IOPS}}.

In various examples, data structure 210 may be populated prior to prediction of log messages and system tuning. For example, log messages and associated metric data may be determined over a first time period. Structured data representing the log messages and the metric data may be generated and stored in data structure 210 as log messages 206 and metric data 208. Accordingly, each structured log message 206 stored in data structure 210 (e.g., log message 206a, 206b, . . . ) may be associated with respective metric data 208 (e.g., metric data 208a, 208b, etc.), according to the log message's time stamp. For example, log message 206a may be associated with metric data 208a. Accordingly, metric data 208a may represent system conditions of a computer system executing the application generating the log message 206a at the time at which log message 206a was generated. As any particular log message may be generated numerous times by an application during execution, and as the system conditions may vary each time the log message is generated, the metric data 208 may represent average system conditions associated with the log message.

After data structure 210 is populated, a machine learning model may be used to predict the next log message to be generated based on an input of time series log data 250. For example, long short term memory (LSTM) 202 may be used to generate predicted log message 204 from an input of time series log data 250. The predicted log message 204 may be used to look up a log message 206 in data structure 210 (e.g., a log message 206 that matches the predicted log message 204).

Once a matching log message 206 is found for the predicted log message 204 in the data structure 210, the corresponding metric data 208 is determined. The metric data 208 identifies particular system conditions 209 (e.g., CPU usage in cores, memory usage in MB, network usage in packets-per-second, disk access in input/output operations per second, etc.). In turn, the system conditions 209 may be used to determine a particular tuning profile 214 (e.g., tuning profiles 214a, 214b, . . . ) from a data structure 212. The tuning profiles 214 may comprise buckets spanning a range of values for each relevant system condition. For example, tuning profile 214a may be associated with 1.4-2.0 CPU cores, as well as with particular ranges of memory usage, network usage, and/or disk usage. Similarly, tuning profile 214b may be associated with a different range of system conditions.

Accordingly, the system conditions 209 that are associated with the predicted log message 204 may be used to lookup a particular tuning profile 214. Each tuning profile 214 may be associated with particular system parameters that may be used to modify the system configuration of the one or more computing devices that are executing the one or more applications that are generating the time series log data 250. The system parameters may be initially determined and stored in data structure 212 based on past instances of the system experiencing the relevant conditions. For example, system conditions 209 may indicate a large amount of memory usage. The tuning profile 214 associated with the large amount of memory usage may indicate that X additional MB of memory should be allocated to the particular guest VM executing the application. Tuning profile 214 may have initially been stored in data structure 212 based on a past occurrence of high memory usage. The system parameters used to allocate additional memory may have been previously determined to remedy the high memory usage condition. Accordingly, the system parameters that allocate additional memory may have been previously stored as part of tuning profile 214 in data structure 212. In another example, system conditions 209 may indicate that processor usage by an application is low. Accordingly, the associated tuning profile 214 may include system parameters that diminish the amount of processor time allocated to the guest VM (or container) executing the application based on the expected low processor usage associated with the predicted log message 204.

The output tuning profile 216 may comprise the parameters that may be used to tune the system. Accordingly, the parameters specified by output tuning profile 216 may be used to generate a modified system configuration 254 from the current system configuration, as described above.

In a cloud computing environment, the output tuning profile 216 may be sent over a network to a cloud controller 220. In turn, the cloud controller 220 may modify system resources (e.g., of one or more computing devices performing various operations for one or more applications as a service) in accordance with the parameters of the output tuning profile 216. In the example depicted in FIG. 2, the output tuning profile may indicate that a capacity of a system resource is going to be exceeded. For example, the output tuning profile may indicate that a guest is going to exceed available memory (based on the predicted log message 204), accordingly, in such an example, the output tuning profile 216 may comprise a request to obtain additional capacity for the system resource. For example, the output tuning profile 216 may comprise a request to resize instance 219. The request to resize instance 219 may be a request to allocate additional memory to the particular guest that has been predicted to generate predicted log message 204.

It should be appreciated that instead of determining an output tuning profile 216 and sending the output tuning profile over network 218 to a cloud controller 220, the various components and operations of system 200 may instead be implemented by the cloud controller 220, in a cloud-based implementation.

Figure 3:
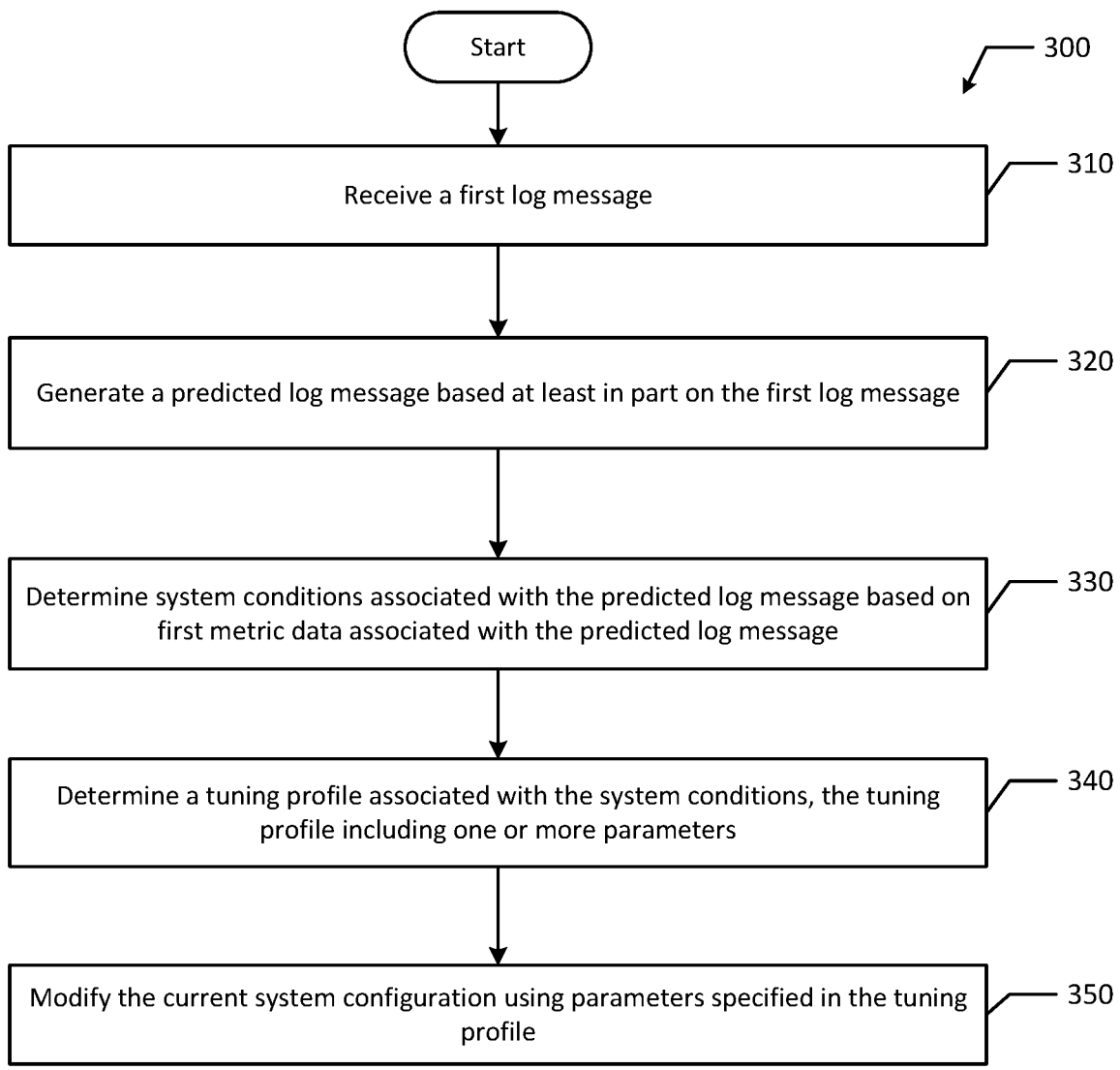
FIG. 3 illustrates a flowchart of an example process for computing device tuning using predicted application log data according to an example embodiment of the present disclosure.

FIG. 3 illustrates a flowchart of an example process 300 for computing device tuning using predicted application log data according to an example embodiment of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving a first log message (block 310). In various examples, log messages may be generated by an application and may be written to an application log file associated with the application. In at least some examples, the log messages may be unstructured data. Structured data representations of the log messages may be generated. The structured data representations may comprise string constant data of the log messages and time stamps associated with a time of occurrence of the log messages.

In an example, the process 300 may include generating a predicted log message based at least in part on the first log message (block 320). For example, a machine learning model, such as an LSTM, may predict a predicted log message based at least in part on the first log message. In an example, the LSTM may further predict the predicted log message based on a time series of past log messages culminating in the most recent log message. The LSTM may determine a predicted log message using the input structured data representations of the time series of log messages. The predicted log message may represent a prediction of the next log message and/or a subsequent log message to be generated by the application. In various examples, the LSTM and/or other RNN may be trained in an unsupervised manner using historical log message data. For example, the LSTM and/or other RNN may be trained using an historical time series of structured log message data (e.g., string constants of the log messages and the associated time stamp data).

In an example, the process 300 may include determining system conditions associated with the predicted log message based on first metric data associated with the predicted log message (block 330). For example, the predicted log message generated at block 320 may be used to query a data structure (e.g., data structure 210) storing various structured representations of log messages (e.g., log messages 206). Each log message may be stored in association with metric data, as described above in reference to FIG. 2. The predicted log message generated by the machine learning model may correspond to a previous log message previously stored in the data structure. The metric data may be a structured representation of system conditions that were associated with the corresponding log message in the past. The system conditions may include such data as processor usage data, memory usage data, disk input/output data, network device data, etc.

In an example, the process 300 may include determining a tuning profile associated with the system conditions (block 340). The system conditions and/or the metric data determined at block 330 may be used to lookup a tuning profile. The tuning profile may include ranges of different values for the various system conditions. For example, a particular tuning profile 214 may be associated with a specific range of processor utilization, a range of memory usage, disk I/O, etc. Each tuning profile 214 may be associated with one or more parameters. In various examples, the parameters may describe system settings for tuning the system. For example, the parameters may be selected in order to accommodate the system conditions that are associated with the predicted log message. For example, a tuning profile associated with high CPU usage may include parameters that specify that the CPU allocation should be increased for the particular application/guest VM/container, etc. Similarly, a tuning profile associated with high network traffic may include parameters that may increase an encoding rate of an encoder and/or may increase a transmission frequency of the network device, etc.

In an example, the process 300 may include modifying the current system configuration using parameters specified in the tuning profile (block 350). In various examples, the parameters from the tuning profile that has been correlated with the predicted log message via the metric data/system conditions associated with the predicted log message may be used to modify the current system configuration to generate a modified system configuration. The modified system configuration may be tuned specifically for the predicted state of the system, as predicted using past metric data/system conditions associated with a past occurrence of a log message corresponding to the predicted log message.

Figure 4A:
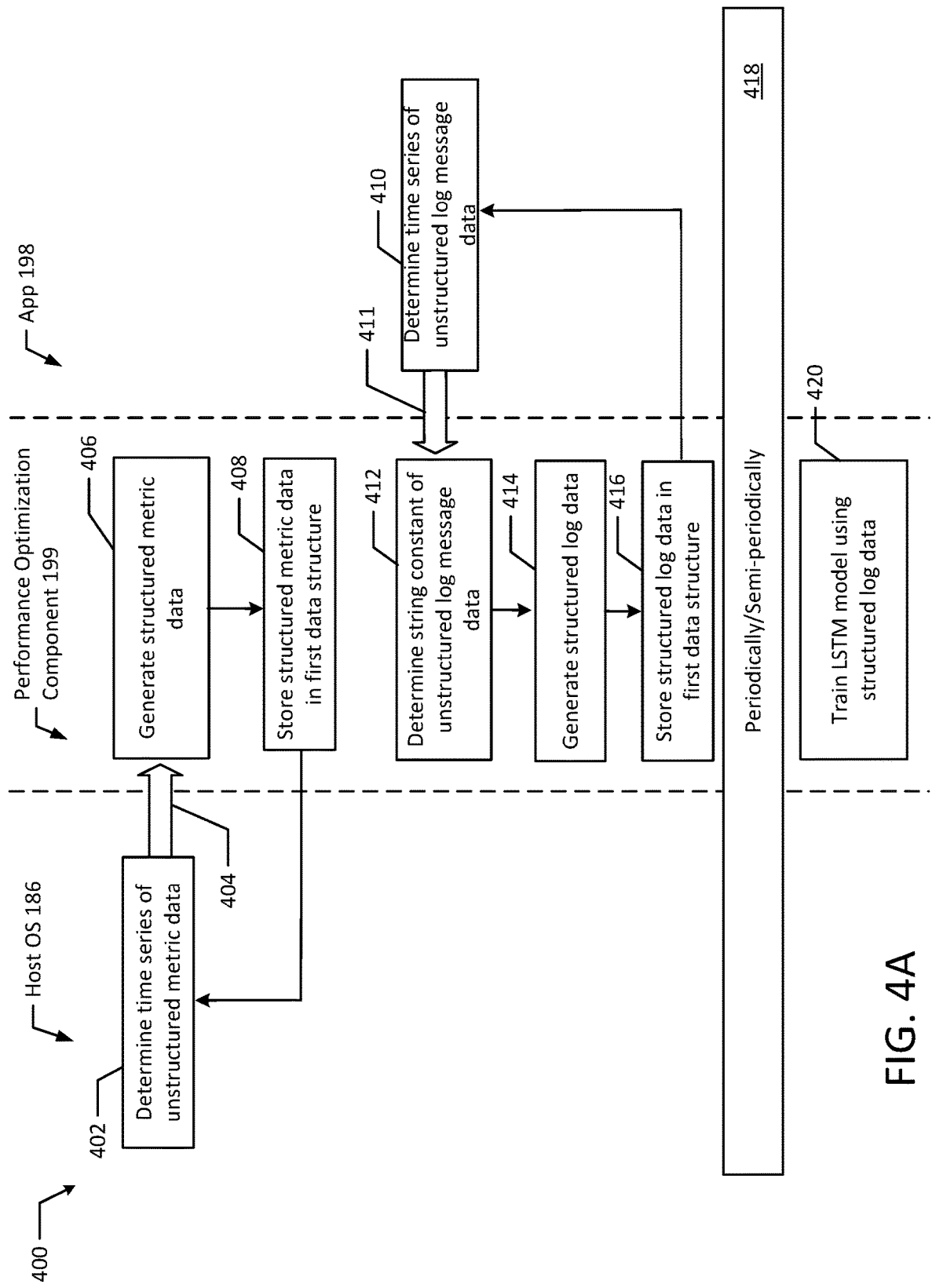
FIGS. 4A and 4B illustrate a flow diagram of an example process for computing device tuning according to an example embodiment of the present disclosure.
Figure 4B:
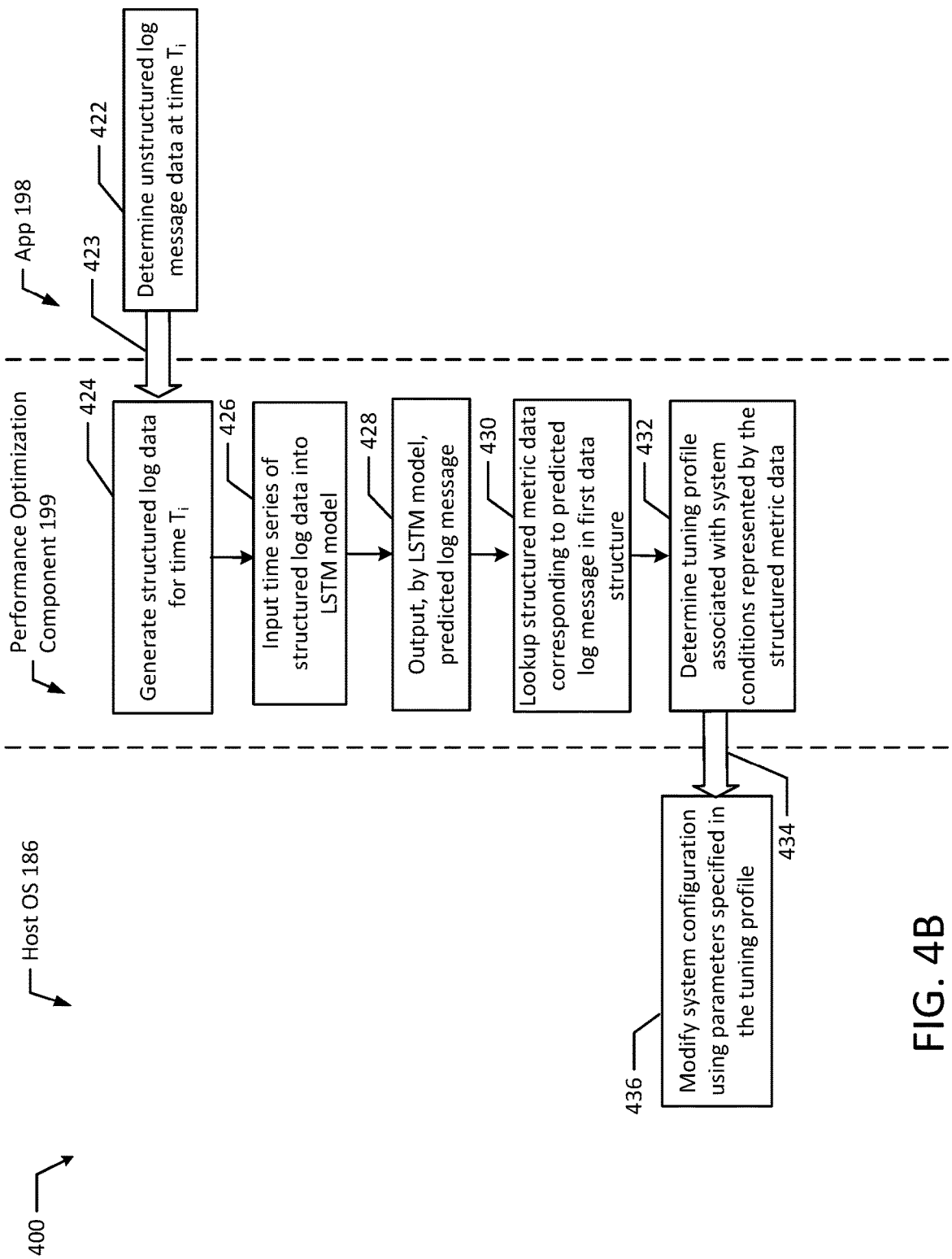

FIGS. 4A and 4B illustrate a flow diagram of an example process for computing device tuning according to an example embodiment of the present disclosure. Although the example process 400 is described with reference to the flow diagrams illustrated in FIGS. 4A and 4B, it will be appreciated that many other methods of performing the acts associated with the process 400 may be used. For example, the order of some of the blocks may be changed, certain blocks may be combined with other blocks, blocks may be repeated, and some of the blocks described are optional. The process 400 may be performed by processing logic that may comprise hardware (circuitry, dedicated logic, etc.), software, or a combination of both. In some examples, a combination of computing devices may execute the various actions described in reference to FIGS. 4A and 4B. For example, a cloud controller 220 may monitor one or more other computing devices that execute applications and may predict log messages generated by such applications. In such examples, cloud controller device 220 may determine tuning profiles that may be used to tune computing devices and/or virtual machines executing the applications. In other examples, a performance optimization component (e.g., performance optimization components 199A, 199B, 115)

may be executed locally on a device that is also executing an application generating log messages. In such an example, the tuning profile may be determined and implemented locally. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In the illustrated example, a host operating system 186 may determine a time series of unstructured metric data (block 402). For example, the time series of unstructured metric data may be determined using/proc and/or/sys virtual filesystems. The unstructured metric data 404 may be sent from the host operating system 186 to a performance optimization component 199. The various actions in FIGS. 4A, 4B described as being performed by performance optimization component 199 may instead be performed by performance optimization component 115. As previously described, the performance optimization component may be implemented locally on the same device executing the application or may be deployed by a system of one or more other computing devices executing remotely in communication with one another via a network. The performance optimization component 199 may generate structured metric data (block 406). Generation of the structured metric data may comprise generating a structured data representation of the raw metric data, as depicted in FIG. 2 (metric data 208a, 208b, etc.).

In various examples, the structured metric data may be stored in a first data structure by performance optimization component 199 (block 408). For example, the structured metric data 208 may be stored in data structure 210. The structured metric data may include time stamp data indicating a time at which the raw, unstructured metric data was determined. Processing may return to block 402 where the host operating system 186 may determine additional unstructured metric data, and blocks 406 and 408 may be repeated.

Additionally, an application 198 may write a time series of unstructured log message data to a log file (block 410). The unstructured log messages 411 may be sent to (and/or the log file may be read by) performance optimization component 199. Performance optimization component 199 may determine string constant of the unstructured log message data (block 412). The performance optimization component 199 may generate structured log data (block 414). The structured log data may include the string constant of the log message as a log key for a particular log message. In addition, the structured log data may comprise a time stamp indicating a time at which the raw, unstructured log message was written to the log file by the application.

The structured log data may be stored in the first data structure (block 416). For example, the structured log data may be stored in data structure 210 in association with metric data having the same and/or a similar time stamp as in the structured log data. Accordingly, each log message generated by an application may be associated in data structure 210 with system conditions (represented by the metric data) that were prevalent at the time at which the log message was generated by the application.

Periodically or semi-periodically (block 418 or when instructed), an LSTM model may be trained using the structured log data (block 420). The LSTM model (or other RNN) may be trained to predict a next log message to be generated by the application. In various examples, the LSTM model may be trained in an unsupervised manner.

As illustrated in FIG. 4B, application 198 may determine and/or write unstructured log message data at a time $T_i$ (block 422). The unstructured log message data 423 may be sent to performance optimization component 199. Performance optimization component 199 may generate structured log data for time $T_i$ (block 424). For example, the string constant of the unstructured log message data 423 may be determined and associated with the time stamp for the time $T_i$.

A time series of structured log data may be input into the LSTM model (block 426). In various examples, the time series may culminate with the most recent structured log data (e.g., current structured log data). The LSTM model may output a predicted log message (block 428). The predicted log message may represent the LSTM model's prediction of the next log message to be generated by the application 198 and written to the application's log file.

The performance optimization component 199 may lookup the structured metric data corresponding to the predicted log message in the first data structure (block 430). For example, the performance optimization component 199 may use the predicted log message to query data structure 210 and may return the structured metric data associated with a structured representation of the log message that corresponds to the predicted log message. The structured metric data may be used to determine the predicted system conditions associated with the predicted log message.

Performance optimization component 199 may determine the tuning profile associated with the system conditions represented by the structured data (block 432). For example, the performance optimization component 199 may use the system conditions to determine a tuning profile 214 to which the system conditions correspond. The tuning profile may comprise one or more parameters (or settings) that may be used to modify a current system configuration to generate a modified system configuration. For example, the parameters of the tuning profile may comprise CPU settings, disk settings, memory settings, I/O settings, etc.

The tuning profile 434 comprising the one or more parameters may be sent to host operating system 186. Host operating system 186 may modify the current system configuration using the parameters specified in the tuning profile (block 436). Accordingly, the system may be configured according to the predicted future state of the system as represented using the predicted log message predicted to be next generated by the application 198.

Figure 5:
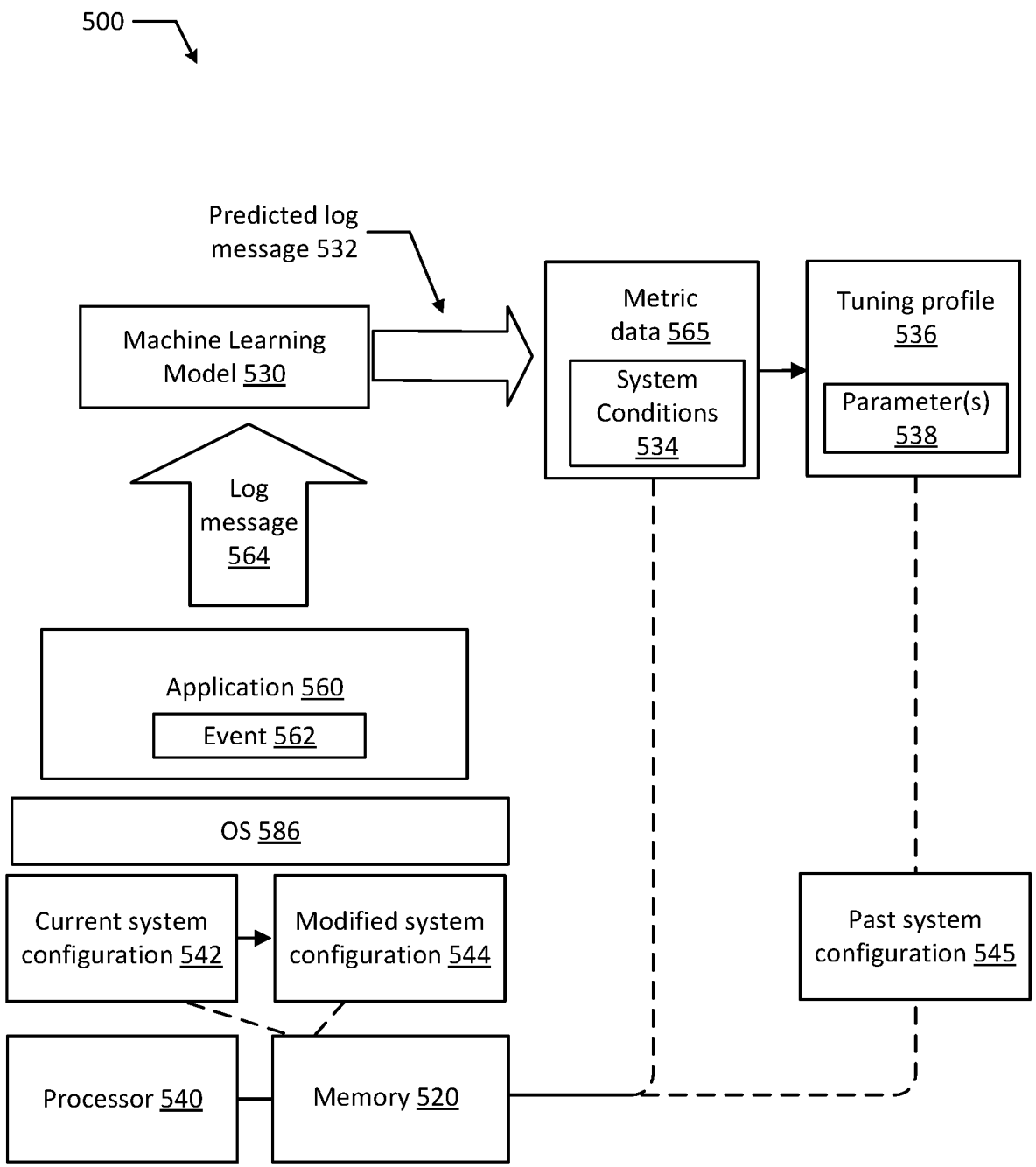
FIG. 5 illustrates a block diagram of an example computing device tuning system according to an example embodiment of the present disclosure.

FIG. 5 is a block diagram of an example computing device tuning system 500 according to an example embodiment of the present disclosure. The system 500 includes a memory 520, a processor 540 in communication with the memory 520, an operating system 586, an application 560 executing on the operating system 586, and a machine learning model 530.

Initially, a current system configuration 542 may be stored in memory 520 and may include configuration settings (e.g., parameters) that may be used to configure processor 540, memory 520, and/or other components of system 500. Application 560 may be executed on operating system 586 (or on another computing device) and may generate one or more events, such as event 562. Event 562 may be any event related to actions performed by application 560, faults related to application 560, system calls made by application 560, etc. A log message 564 may be generated by the application 560 in response to the event 562. The log message 564 may describe the event 562. The log message 564 may be written to a log file of the application 560. A time series of structured data representations of the log messages (including a structured data representation of the log message 564) may be input into a machine learning model 530 (e.g., LSTM 202). The machine learning model 530 may be trained to output predicted log message 532 representing a subsequent log message predicted to be output by application 560 (e.g., in response to a future application event).

The predicted log message 532 may be used to determine metric data 565 stored in memory 520. The metric data 565 may be associated with a past occurrence of the log message that has been predicted by machine learning model 530. The metric data 565 may be a structured data representation of system conditions 534 (or average system conditions) that were present at a time corresponding to one or more past occurrences of the predicted log message. The system conditions 534 may, in turn, be used to look up a tuning profile 536 that corresponds to the system conditions. The tuning profile 536 may specify ranges of different system conditions for different system components (e.g., CPU utilization ranges, memory usage ranges, disk I/O ranges, network device utilization ranges, etc.). Accordingly, the system conditions associated with the predicted log message 532 may be specific system conditions that fall within the range of values specified by tuning profile 536 (selected from among a plurality of stored tuning profiles). The tuning profile 536 may originally be stored in memory 520 in association with a past system configuration 545. Accordingly, the parameters 538 may have initially been optimized for a past system state represented by past system configuration 545.

Each tuning profile 536 may be associated with one or more parameters representing system settings that may be used to modify the current system configuration 542 into a modified system configuration 544. For example, the parameters 538 may specify a CPU voltage and/or frequency for CPU operation, a memory allocation for a guest VM/application, disk I/O settings, etc.

Among other potential benefits, the various systems and techniques described herein dynamically predict future computing device states using a time series of log data generated by one or more applications executing on the computing device. The predicted log messages are associated with system conditions that may have been prevalent during past occurrences of the predicted log message. The system conditions associated with the predicted log message are used to determine a tuning profile that tunes the computing device (or system of computing devices) to optimize the computing device configuration for the expected future state indicated by the predicted log message.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
 a memory; and
 at least one processor in communication with the memory, the at least one processor configured to:
  receive a first log message denoting an event associated with a first application executing in the system;
  generate, by a machine learning model, a predicted log message based at least in part on the first log message, wherein the predicted log message represents a prediction of a subsequent log message to be received from the first application;
  determine first metric data associated with the predicted log message, the first metric data describing system conditions of the system associated with the predicted log message;
  determine a tuning profile associated with the system conditions, the tuning profile comprising one or more parameters associated with a past system configuration; and
  modify a current system configuration of the system using the one or more parameters of the tuning profile to generate a modified system configuration.

2. The system of claim 1, wherein the at least one processor is further configured to:
 receive a plurality of historical log messages prior to the first log message; and
 determine metric data for each of the plurality of historical log messages, wherein the predicted log message is further generated based at least in part on the plurality of historical log messages.

3. The system of claim 1, wherein the at least one processor is further configured to:
 determine a string constant of the first log message;
 determine a time stamp associated with the first log message;
 generate first structured data comprising the string constant and the timestamp; and
 input the first structured data into the machine learning model, wherein the predicted log message is generated based at least in part on the first structured data.

4. The system of claim 1, wherein the at least one processor is further configured to:
 determine performance data associated with a past occurrence of the predicted log message;
 determine a time stamp associated with the past occurrence of the predicted log message, wherein the performance data describes a performance of a first system component at a time associated with the time stamp;
 generate the first metric data, wherein the first metric data comprises a first structured data representation comprising the time stamp and the performance data; and
 store the first metric data in a data structure in association with a second structured data representation of the predicted log message.

5. The system of claim 4, wherein the performance data describes a performance of at least one of a central processing unit (CPU), the memory, a network interface, or an input/output device.

6. The system of claim 1, wherein:
the machine learning model comprises a long short term memory (LSTM) model; and
the LSTM model is effective to generate the predicted log message based at least in part on a first time series of log messages including the first log message.

7. The system of claim 1, wherein to determine the system conditions the at least one processor is further configured to use the predicted log message to look up the first metric data in a data structure, wherein the first metric data describes the system conditions at a time at which a previous log message corresponding to the predicted log message was generated.

8. The system of claim 1, wherein the tuning profile comprises one or more of a CPU setting and a memory allocation setting for the system.

9. The system of claim 1, wherein the at least one processor is further configured to:
determine that the system conditions indicate that a capacity of a system resource is to be exceeded; and
send a request for allocation of additional capacity for the system resource to a cloud controller.

10. A method comprising:
receiving a first log message denoting an event associated with a first application executing in a system;
generating, by a machine learning model, a predicted log message based at least in part on the first log message, wherein the predicted log message represents a prediction of a subsequent log message to be received from the first application;
determining first metric data associated with the predicted log message, the first metric data describing system conditions of the system associated with the predicted log message;
determining a tuning profile associated with the system conditions, the tuning profile comprising one or more parameters associated with a past system configuration; and
modifying a current system configuration using the one or more parameters of the tuning profile to generate a modified system configuration.

11. The method of claim 10, further comprising:
receiving a plurality of historical log messages prior to the first log message; and
determining metric data for each of the plurality of historical log messages, wherein the predicted log message is further generated based at least in part on the plurality of historical log messages.

12. The method of claim 10, further comprising:
determining a string constant of the first log message;
determining a time stamp associated with the first log message;
generating first structured data comprising the string constant and the timestamp; and
inputting the first structured data into the machine learning model, wherein the predicted log message is generated based at least in part on the first structured data.

13. The method of claim 10, further comprising:
determining performance data associated with a past occurrence of the predicted log message;
determining a time stamp associated with the past occurrence of the predicted log message, wherein the performance data describes a performance of a first system component at a time associated with the time stamp;

generating the first metric data, wherein the first metric data comprises a first structured data representation comprising the time stamp and the performance data; and
storing the first metric data in a data structure in association with a second structured data representation of the predicted log message.

14. The method of claim 13, wherein the performance data describes a performance of at least one of a central processing unit (CPU), a memory, a network interface, or an input/output device.

15. The method of claim 10, wherein:
the machine learning model comprises a long short term memory (LSTM) model; and
the LSTM is effective to generate the predicted log message based at least in part on a first time series of log messages including the first log message.

16. The method of claim 10, further comprising using the predicted log message to look up the first metric data in a data structure, wherein the first metric data describes the system conditions at a time at which a previous log message corresponding to the predicted log message was generated.

17. The method of claim 10, further comprising:
determining that the system conditions indicate that a capacity of a system resource is to be exceeded; and
send a request for allocation of additional capacity for the system resource to a cloud controller.

18. A non-transitory machine readable medium storing a program, which when executed by at least one processor causes the at least one processor to:
receive a first log message denoting an event associated with a first application executing in a system;
generate, by a machine learning model, a predicted log message based at least in part on the first log message, wherein the predicted log message represents a prediction of a subsequent log message to be received from the first application;
determine first metric data associated with the predicted log message, the first metric data describing system conditions of the system associated with the predicted log message;
determine a tuning profile associated with the system conditions, the tuning profile comprising one or more parameters associated with a past system configuration; and
modify a current system configuration using the one or more parameters of the tuning profile to generate a modified system configuration.

19. The non-transitory machine readable medium of claim 18, which, when executed by the at least one processor, further causes the at least one processor to:
receive a plurality of historical log messages prior to the first log message; and
determine metric data for each of the plurality of historical log messages, wherein the predicted log message is further generated based at least in part on the plurality of historical log messages.

20. The non-transitory machine readable medium of claim 18, which, when executed by the at least one processor, further causes the at least one processor to:
determine a string constant of the first log message;
determine a time stamp associated with the first log message;
generate first structured data comprising the string constant and the timestamp; and input the first structured data into the machine learning model, wherein the predicted log message is generated based at least in part on the first structured data.

* * * * *